United States Patent
Ramanathan et al.

(10) Patent No.: US 9,317,326 B2
(45) Date of Patent: Apr. 19, 2016

(54) CONSISTENT MIGRATION OF A GROUP OF VIRTUAL MACHINES USING SOURCE AND DESTINATION GROUP MESSAGING

(71) Applicant: VMware, Inc., Palo Alto, CA (US)

(72) Inventors: Arunachalam Ramanathan, San Jose, CA (US); Gabriel Tarasuk-Levin, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 127 days.

(21) Appl. No.: 14/092,619

(22) Filed: Nov. 27, 2013

(65) Prior Publication Data

US 2015/0149999 A1    May 28, 2015

(51) Int. Cl.
*G06F 9/48*    (2006.01)
*G06F 9/455*    (2006.01)

(52) U.S. Cl.
CPC .......... *G06F 9/4856* (2013.01); *G06F 9/45533* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,257,811 B2 | 8/2007 | Hunt et al. | |
| 7,383,405 B2 | 6/2008 | Vega et al. | |
| 7,421,578 B1 * | 9/2008 | Huang et al. | 713/163 |
| 7,484,208 B1 * | 1/2009 | Nelson | 718/1 |
| 7,680,919 B2 | 3/2010 | Nelson | |
| 8,042,108 B2 | 10/2011 | Suwarna | |
| 8,069,218 B1 * | 11/2011 | Tormasov et al. | 709/216 |
| 8,117,613 B2 | 2/2012 | Uyeda | |
| 8,127,296 B2 | 2/2012 | Khatri et al. | |
| 8,150,971 B2 | 4/2012 | Lublin et al. | |
| 8,156,490 B2 | 4/2012 | Bozek et al. | |
| 8,260,904 B2 | 9/2012 | Nelson | |
| 8,321,862 B2 * | 11/2012 | Swamy et al. | 718/1 |
| 8,335,813 B2 * | 12/2012 | Sun et al. | 709/201 |
| 8,352,938 B2 | 1/2013 | Hunt et al. | |
| 8,370,832 B2 | 2/2013 | White | |
| 8,396,986 B2 | 3/2013 | Kanada et al. | |
| 2010/0287548 A1 * | 11/2010 | Zhou et al. | 718/1 |
| 2011/0320556 A1 * | 12/2011 | Reuther | 709/213 |
| 2013/0232164 A1 * | 9/2013 | Bigney et al. | 707/769 |

* cited by examiner

*Primary Examiner* — Meng An
*Assistant Examiner* — Jorge A Chu Joy-Davila

(57) ABSTRACT

A plurality of virtual machines (VMs) is migrated from a source group to a destination group in such as way as to achieve consistency and either availability or group preservation. Execution of VMs in the source group is selectively delayed during state migration so that memory transfer of all the VMs in the group will converge roughly at the same time. After VM state transfer to the destination group, execution switch-over is coordinated using different handshake and acknowledgement messages, passed either through a "leader" VM in each group, or directly between source-destination VM pairs.

28 Claims, 6 Drawing Sheets

CONSISTENT MIGRATION OF A GROUP OF VIRTUAL MACHINES USING SOURCE AND DESTINATION GROUP MESSAGING

FIELD OF THE INVENTION

This invention relates to virtual computing and in particular to migrating virtual machines between different host platforms.

BACKGROUND

Virtual machine technology has changed the modern world by making all manner of computer resources more available, more efficient, more affordable, and more flexible. No longer are computational tasks tied to single, fixed, physical "boxes". Indeed, by implementing a "computer" essentially wholly as a software construct, that is, as a virtual machine (VM), a user may not even know where actual data storage and processing are taking place as he runs a given application. Virtualization is at the heart of this revolution.

Even the virtual world must, however, ultimately run on at least one physical processing platform somewhere. Consequently, even a system of VMs is constrained by well-known physical realities. For example, the server on which VMs may be running might need to be halted or even powered off to allow for maintenance or upgrades. As another example, one server's workload may become so great compared to another's that there is a need for load balancing so as to improve overall performance by more efficiently allocating the physical computing resources.

One of the key advantages of virtualization is the ease of management and the ability to do such maintenance, load balancing, etc., with minimal downtime, and one of the primary tools to accomplish many of these tasks is "live migration". As the name implies, "migrating" a VM involves moving it, at least functionally, from one physical host to another. One of the earliest successful techniques for migrating VMs is described in U.S. Pat. No. 7,484,208 (Nelson), which not only enabled migration of a VM from a source to a destination platform, but did so while the source VM was still running, thereby reducing the downtime experienced by the user usually to an unnoticeable level.

Live VM migration has thus been around for a decade and has naturally evolved, for example, from host to storage to "shared nothing" migration. So far, migration has been limited to migrating a single VM; however, nowadays some users run a variety of applications, tiers, clusters, etc., that involve more than one VM simultaneously, and even in other cases there is a need to be able to migrate not only one, but a set of VMs, while still keeping downtime as low as possible.

Existing approaches for migrating a group of VMs can be classified into two general types: parallel and sequential. For parallel migration, a set of VMs is started at the same time. The migrations may or may not complete at the same time, depending on VM memory size, memory dirty rate (see below) and network bandwidth. For sequential migration, a set of VMs is queued and executed one by one, such that the VMs switch-over execution to the destination at different times.

Conventional parallel and sequential migration both suffer from the shortcoming that migration failures may result in a split state of the VM group. In this context, group state is "split" when at least one VM in the group is running on the source platform while the remaining VM(s) are running on the destination platform. Split state may be undesirable in cases of applications whose execution spans multiple VMs. One example of such an application is a tiered application, with a backend or database layer, possibly a middle processing tier, and a frontend or web tier.

Another example of an instance in which it is disadvantageous to split the state of a set of VMs is where a VM-based system implements disk storage using virtual volumes that are exposed and managed by the underlying storage as logical unit numbers (LUNs) rather than just being files on in a VM the system. In this case, group consistency is important. In general, volumes can be added to a consistency group, which makes it possible to perform such operations as creating a snapshot, and replication can be performed on a group instead of individual volumes. Group level operations provide easier management and are sometimes more efficient. In case of virtual volumes, each volume is typically a VM disk, which is then to be moved. A set of a VM's disks (that is, a virtual volume consistency group) can be migrated to a different datastore. Failure to move one of the VM's disks may thus result in a violation of some of the group properties. Some systems, such as the Storage vMotion (SvMotion) feature provided by VMware, Inc., of Palo Alto, Calif., are provided to indicate VM migration failure if any of the disks of a single VM fails to migrate, but in the case where a consistency group comprises of a set of volumes which belong to different VMs, group migration can help prevent split state and preserve the consistency group.

Still another example is a cluster application. For example, some databases can run as a cluster of machines, which closely communicate with each other. When such a clustered database runs on multiple virtual machines and they are migrated, failure to migrate one of the VMs may result in split state. When there is split state in a long-distance migration, communication time between some of the machines typically increases. Again, group migration may be used to prevent this situation.

In still other cases, splitting the state of a clustered application in a VM group may in some cases violate such VM properties such as affinity, possibly resulting in degraded application performance due to communication latency between two data centers. In this case, group migration may help to maintain application performance.

It is therefore generally desirable to be able to migrate a group of VMs with as little disruption and delay of execution as possible.

DETAILED DESCRIPTION

Figure 1:
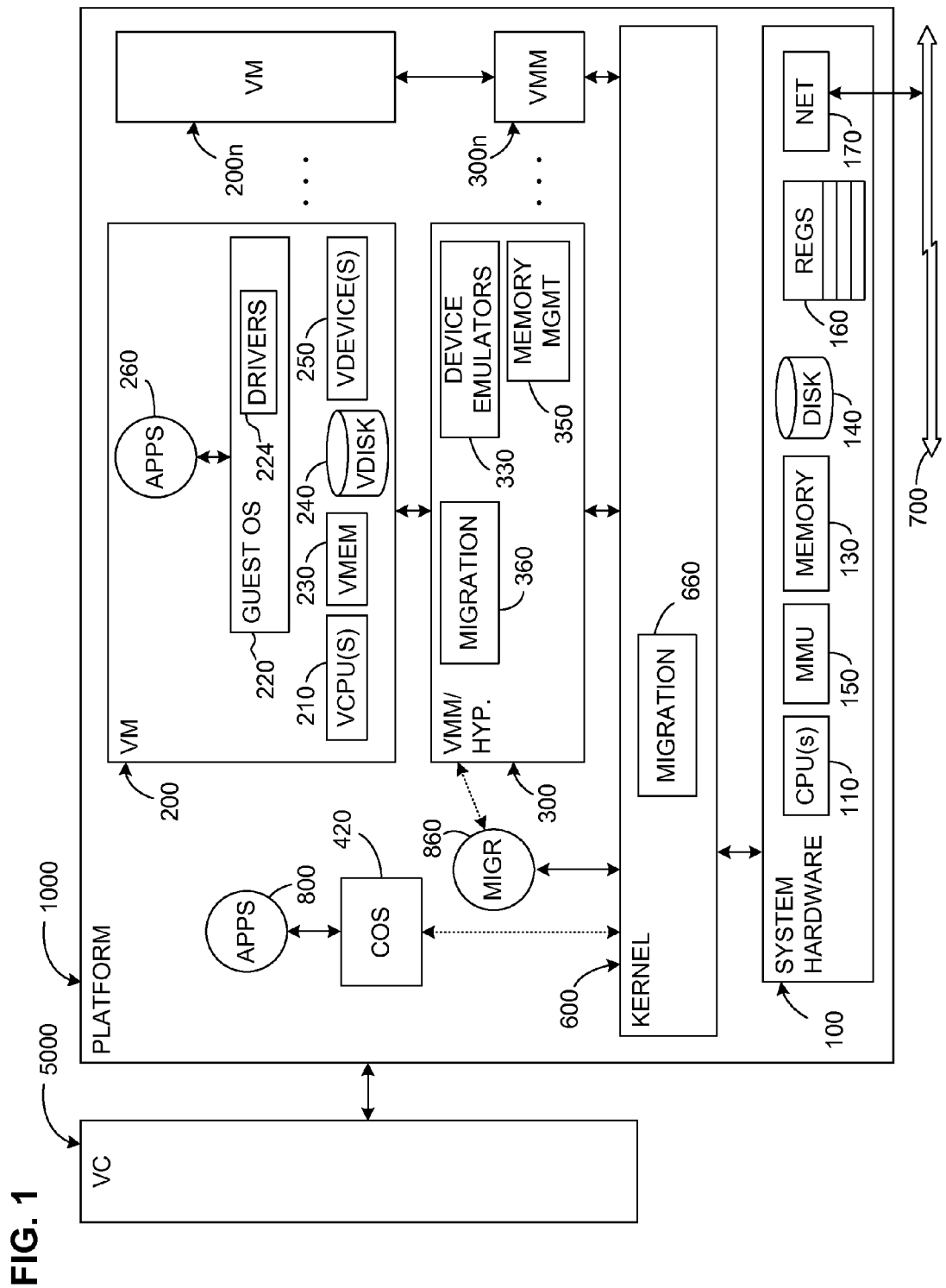
FIG. 1 illustrates the main components of a system of virtualized computers, including software components to enable group migration of virtual machines.

To best understand various aspects, it will help to be familiar with certain terms and concepts used in this description, in particular, "pre-copying", "dirty rate", "stunning", and "keepalive message".

Memory Pre-Copying and Pre-Copy Convergence

It would in general cause too long a delay to shut down a source VM, transfer its entire memory over a network to the corresponding destination VM, then start the destination VM after all non-memory state has been transferred as well. One known way to transfer the memory of a source VM while it is still running to a destination VM is to do so asynchronously and, as needed, iteratively, that is, over multiple "passes," before the non-memory state is transferred. According to this iterative memory transfer procedure, a first set of pages of the source VM's memory is copied to the destination VM. During the time the memory is being transferred, however, the source VM, which is allowed to continue running, may modify some of the transferred pages. Modifications to the source VM's memory may be detected and tracked using any known method, such as a write-protection mechanism or a separate table indicating memory modifications. These modified pages are then re-transferred to the destination. While they are being transferred, however, the source VM may modify still other pages (or even modify a previously modified page again). The newly modified pages are then retransferred, and so on. Eventually, this iterative process of source-to-destination memory transfer will converge ("memory pre-copy convergence", or, more generally, simply "pre-copy convergence") such that the set of memory pages that has not yet been transferred will be small enough that it can be transferred all at once within a chosen maximum downtime threshold, at which point the system may halt the source VM, transfer those remaining pages, and start the destination VM. In short, as the term implies, "pre-copying" involves copying the contents of the source VM's memory to the destination VM mostly while the source VM is still running. Such an asynchronous, iterative method is one way to accomplish pre-copying, but this invention does not depend on any particular pre-copying technique; skilled system designers will choose a suitable technique for each given implementation.

Dirty Rate

Generally speaking, dirty rate is the rate at which a VM is currently changing the content of its physical memory. Using an iterative pre-copy approach, for example, the system supervising the VMs, such as a virtual machine monitor or "hypervisor," may need to install write traces on each of the VM's memory pages and monitor each page to see if it has changed since the last time it was transferred to the destination VM. When the supervisory system decides to transfer a page, it is marked as "clean," but then transitions back to "dirty" when the supervisory system observes the VM remapping/faulting the page for write. Note that it will typically be irrelevant how many times a source VM writes to a given page—all that matters is retransmitting a page if it has changed at all since the last time it was copied to the destination. The rate at which the supervisory system observes pages transitioning to "dirty" from "clean" is the "dirty rate," which may be expressed in units such as MBps.

Until the supervisory system actually begins to migrate a source VM, it will typically not know that VM's dirty rate. It would be possible to approximate the VM's working set by sampling its page "dirty behavior;" however, this will not provide much information about the rate at which pages are being modified, but rather only about the scope of the working set of pages itself. When pre-copying has started, however, and page traces and re-traces can be monitored, the supervisory system can more accurately estimate the current dirty rate. Note that the further pre-copying proceeds, the more quickly the system will be transmitting pages (since there will be fewer pages to send at each iteration), the more quickly it will be retracing pages, and the more accurate the dirty rate estimate will become.

Stunning

Stunning refers to quiescing a running source VM. Although different virtual systems may accomplish this differently, one method involves the following: The supervisory system stops executing VM instructions ("guest" instructions), drains in-flight VM IO (IO operations that the VM has submitted to the supervisory system kernel but that have not yet completed), serializes virtual device state (SCSI, network, virtual CPU, etc.), closes various locks on VM components and operations such as virtual disks, and suspends any other state-changing operations. The supervisory system can then hand off execution of the source VMs instructions to the destination VM, where the supervisory system can, for example, restore serialized virtual device state, reopen locks, and resume instruction execution from where the source VM left off.

"keepalive"

In virtualized systems provided by VMware, a keepalive message is used to update progress during a VM migration and helps to prevent time-out related migration failures. The response to a keepalive message will indicate if the associated VM is progressing in its execution or is stuck or has crashed. Similar messages or commands are found in other virtualized systems, or can be readily created by programmers familiar with systems that are running VMs. In this description, the term "keepalive" message indicates all such messages/commands, regardless of what maker or architecture is used for the virtualized computer system.

General Virtualized Computer System

As is well known in the field of computer science, a virtual machine (VM) is a software abstraction—a "virtualization"—of an actual physical computer system. As FIG. 1 illustrates, a typical virtualization infrastructure will include one or more host platforms 1000 that support a set of virtual machines and their supporting and supervisory hardware and software modules, as well as, usually, some form of virtual center (VC) server 5000 that forms a centralized initiating and supervisory system for provisioning and managing the overall virtual infrastructure. FIG. 1 also illustrates, in part, the general configuration of a virtual machine 200, which is installed as a "guest" on a "host" hardware platform 100.

As FIG. 1 shows, the hardware platform 100 includes one or more processors (CPU's) 110, system memory 130, and a storage device, which will typically be a disk 140. The system memory will typically be some form of high-speed RAM, whereas the disk (one or more) will typically be a non-volatile, mass storage device. The hardware 100 will also include other conventional mechanisms such as a memory management unit MMU 150, various registers 160, and any conventional network connection device 170 for transfer of data between the various components of the system and a network 700, which may be any known public or proprietary local or wide-area network such as the Internet, an internal enterprise network, etc.

The design and operation of virtual machines is well known in the field of computer science. Nonetheless, the general characteristics of a virtualized computer system are summarized here for completeness and to establish some properties that make group migration possible. Each VM 200 will typically include at least one virtual CPU 210, a virtual disk 240, a virtual system memory 230, a guest operating system (which may but need not be simply be a copy of a conventional operating system) 220, and various virtual devices 250, in which case the guest operating system ("guest OS") will include corresponding drivers 224. All (for a fully virtualized system) or at least most (in a "para-virtualized system") the components of the VM may be implemented in software using known techniques to emulate the corresponding components of an actual computer.

If the VM is properly designed, then it need not necessarily be apparent to the user that any applications 260 running within the VM are running indirectly, that is, via the guest OS and virtual processor. Applications 260 running within the VM will act essentially the same as they would if run on a "real" computer, except, for example, for a decrease in running speed that will be noticeable only in exceptionally time-critical applications. Executable files will be accessed by the guest OS from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application.

Some interface is usually required between a VM and the underlying host platform (in particular, the CPU), which is responsible for actually executing VM-issued instructions and transferring data to and from the actual memory and storage devices, usually including one or more levels of address translation/mapping. Common terms for this interface include "hypervisor" and "virtual machine monitor" (VMM), shown as component 300. For the sake of simplicity, the term "virtual machine monitor" or its abbreviation "VMM" is used below to refer to this component 300, whether its actual manufacturer calls it such or a "hypervisor". A VMM is usually a thin piece of software that runs directly on top of a host, or directly on the hardware, and virtualizes all or at least selected ones of the resources of the machine. Among other components, the VMM therefore usually includes device emulators 330. The VMM also usually tracks and either forwards (to some form of operating system) or itself schedules and handles all requests by its VM for machine resources, as well as various faults and interrupts.

Although the VM (and thus the user of applications running in the VM) cannot usually detect the presence of the VMM, the VMM and the VM may be viewed as together forming a single virtual computer, although it would be possible for a VM to be migrated to being under the control of a different VMM if all the VM state is properly migrated too. They are shown in FIG. 1 as separate components for the sake of clarity.

In some known systems, the VMM is co-resident at system level with a host operating system. Both the VMM and the host OS can then independently modify the state of the host processor, but the VMM calls into the host OS via a driver and a dedicated user-level application to have the host OS perform certain I/O operations of behalf of the VM. The virtual computer in such a configuration is thus fully hosted in that it runs on an existing host hardware platform together with an existing host OS. In other implementations, a dedicated kernel takes the place of and performs the conventional functions of the host OS, and virtual computers run on the kernel. FIG. 1 illustrates a kernel 600 that serves as the system software for several VM/VMM pairs 200/300, ..., 200n/300n. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs.

A conventional "console" operating system (COS) 420 may also be included within the host platform 1000 to allow applications 800 unrelated to virtualization to run; for example, a system administrator may need such applications to monitor the hardware 100 or to perform other administrative routines. One such routine may be the coordination and monitoring of VM migration, although these functions may also be performed together with or instead by whatever operating system and administrative routines that are installed in the VC 5000. In fact, the COS 420 itself and the applications 800 may be incorporated into the VC 5000, or the various functional responsibilities may be split between the two entities. In one embodiment, for example, the VC 5000 contacts the platform system 1000 to initiate VM group migration, but coordination and monitoring of the actual migration was handled via a console OS within the platform 1000. In some systems, no COS is needed at all, but rather may be replaced by a different user-level management service; the type of user-level management process used in any given virtualized system is a known design choice.

Software modules 360, 660, and 860 are shown in the VMM 300, kernel 600, and supervisory computer system 1000, respectively, and comprise the computer-executable code that implements the various group-migration features described further below. Note that it may not be necessary to include migration code in all of these three entities—the system designer will choose the configuration using normal design methods.

As system designers will understand, the various computational and administrative modules shown in FIG. 1 (as well as the other figures) within the source and destination servers, as well as the virtual machines, the VMMs and the kernels themselves comprise computer-executable instructions that may be provided, stored, loaded and executed from any known computer-readable storage medium, including downloading the code over a network into memory or other storage units, on physical media such as CD-ROM or other disks, on optical or magnetic storage media, on flash or other RAM-based memory devices, etc.

For the purposes of understanding concepts of group migration as described here, the salient points of the discussion above are:

1) each VM has its own state;
2) if two instantiations of a VM have the same configuration and state, a user will typically not know which of the two he is currently using;
3) the entire state (including memory) of any VM is available to its respective VMM, and the entire state of any VM and of any VMM is either available to the kernel 600 or other platform system, or can be recomputed or abstracted to some sufficient level of accuracy so as to be transparent to the guest; and
4) as a consequence of 1)-3), a VM is "relocatable."

VM Migration Workflow

Figure 2:
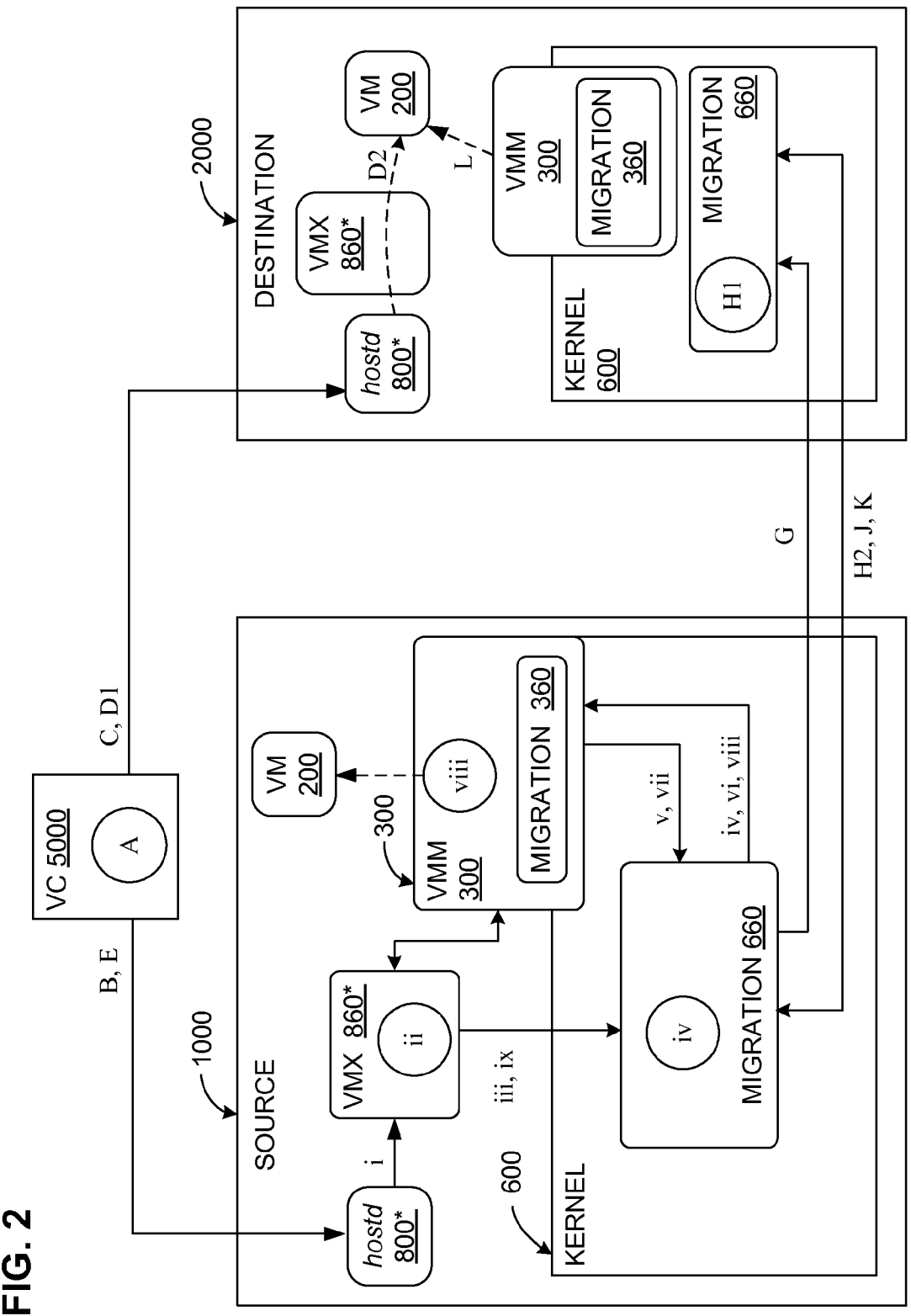
FIG. 2 illustrates one example of the components and workflow involved in virtual machine migration.

FIG. 2 illustrates the components and workflow typically employed in single-VM migration from a source platform 1000 to a destination platform 2000. The reference number 1000 is used for the source in FIG. 2 since it could be configured as the system 1000 in FIG. 1; the destination platform 2000 may, and will typically, be configured similarly. Note that the workflow illustrated in FIG. 2 and described here is typical but not the only possible design choice for different VM migration systems—actual workflows may vary depending on the underlying physical and virtual system architecture as well as the needs of particular implementations.

In the workflow example illustrated in FIG. 2, the migration module 860 is shown as "VMX" and the host-level components COS 420 and relevant applications 800 are shown collectively as component 800\* hostd. The supervisory system that coordinates migration will comprise the migration modules at various levels of the software stack, namely 360, 660 and 860 (see also FIG. 1). The main aspects of the workflow will typically involve the management, source and destination platforms and will generally include:

Management level migration workflow (A-E):
   A. VC 5000 computes the migration specification;
   B. Source preparation—VC 5000 sends a migration request to hostd 800\* in the source 1000;
   C. Destination preparation—VC 5000 sends a migration request to hostd 800\* in the destination 2000;
   D1. Destination initiation—VC sends a start migration instruction to destination 2000, which registers the VM with hostd, which (D2) creates a VM object to receive data from source;
   E. Source initiation—VC 5000 sends a start migration instruction to the source 1000 which in turn calls hostd and passes the computed specification.

Platform (source-destination) level migration workflow (F-L):
   F. Source-focused workflow steps:
     i. Receive Migration Specification: source hostd 800\* receives the specifications of the requested migration from the VC 5000 or whichever centralized supervisory system is provided for provisioning and managing the virtual infrastructure and passes these on to VMX 860\*.
     ii. Initiate Migration: VMX interprets the migration specifications and initiates migration in the kernel.
     iii. Pre-Copy Initiation; VMX calls to the migration module 660 in the kernel to initiate pre-copy.
     iv. Pre-Copy Start: The kernel migration module prepares for pre-copy and posts an action to the VMM 300 to start pre-copy.
     v. Pre-Copy Pages: The VMM 300 calls down to the kernel to fetch a map (such as an initial bit map) for finding pages, and provides pages for pre-copy.
     vi. Pre-Copy Next: The kernel migration module processes pages for pre-copy and posts a monitor action for subsequent pages for pre-copy.
     vii. Pre-Copy Iteration Completion: The VMM checks with the kernel for memory pre-copy convergence.
     viii. Quiescence of Source VM: When the kernel informs the VMM that pre-copy iteration has completed, the VMM suspends the source VM 200.
     ix. Checkpoint: VMX calls down to the kernel to provide the checkpoint of the source VM.
   G. Once the source kernel 600 receives the source VM checkpoint, it transmits it to the destination.
   H1. After any remaining incremental "dirty pages" left over at the time of pre-copy convergence are transmitted, the destination 2000 restores from the checkpoint, and (H2) sends a resume handshake message to the source 1000.
   J. The source 1000 receives resume handshake sends an acknowledgement message (ACK) and powers down.
   K. The destination 2000 receives the ACK message from the source.
   L. The destination VM is resumed, at which time the destination VMM 300 starts executing guest instructions.

Note that the time between when the source VM is quiesced (step VIII) and the when the destination VM resumes (step K) is commonly referred to as the "downtime" since, during that time, no VM—neither the source nor the destination—is executing guest instructions.

Group Membership

Before some group of VMs are migrated as a group, it is necessary to identify which VMs are to be in the group in the first place. In some instances, the need will be to migrate all of the VMs substantially atomically, whereas in other instances this will not be necessary and it will be permissible for the group to have partially split state. Moreover, the set of migrating VMs needs to have a notion of group membership in order to attain group-level consensus. Group membership also helps in group messaging, which different embodiments here use to achieve group-level stun and group-level switch-over.

In one embodiment, the VC 5000 determines the group of VMs to be migrated and passes the information to source and destination hosts through a migration specification. The hosts then construct group membership from the migration specification received from VC 5000. The VC may determine the VM group through user selection, a host maintenance mode, a Distributed Resource Scheduler (a utility in VMware-based systems that balances computing workloads with available resources in a virtualized environment), etc.

Figure 3:
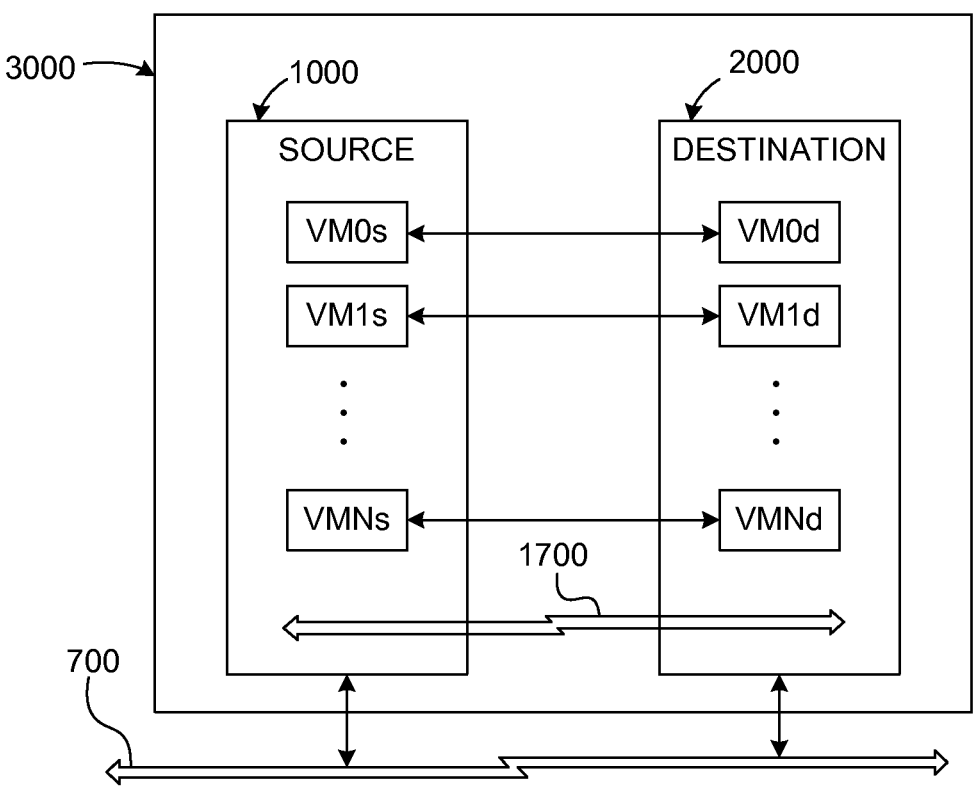
FIG. 3 illustrates a source and destination platform for respective groups of virtual machines.

As FIG. 3 illustrates, a migrating VM has a source 1000 and destination 2000. In this figure, the source is labeled 1000, since it could be configured as the system 1000 in FIG. 1; the destination 2000 may be similarly configured. As FIG. 3 illustrates, it's not necessary for the source and destination platforms (typically servers) to be parts of totally separate global systems; rather, both the source and destination may be virtual machine platforms within a larger virtualization infrastructure 3000, which will then include administrative and processing modules to enable either manual or automatic control of the included virtual machines.

Figure 4:
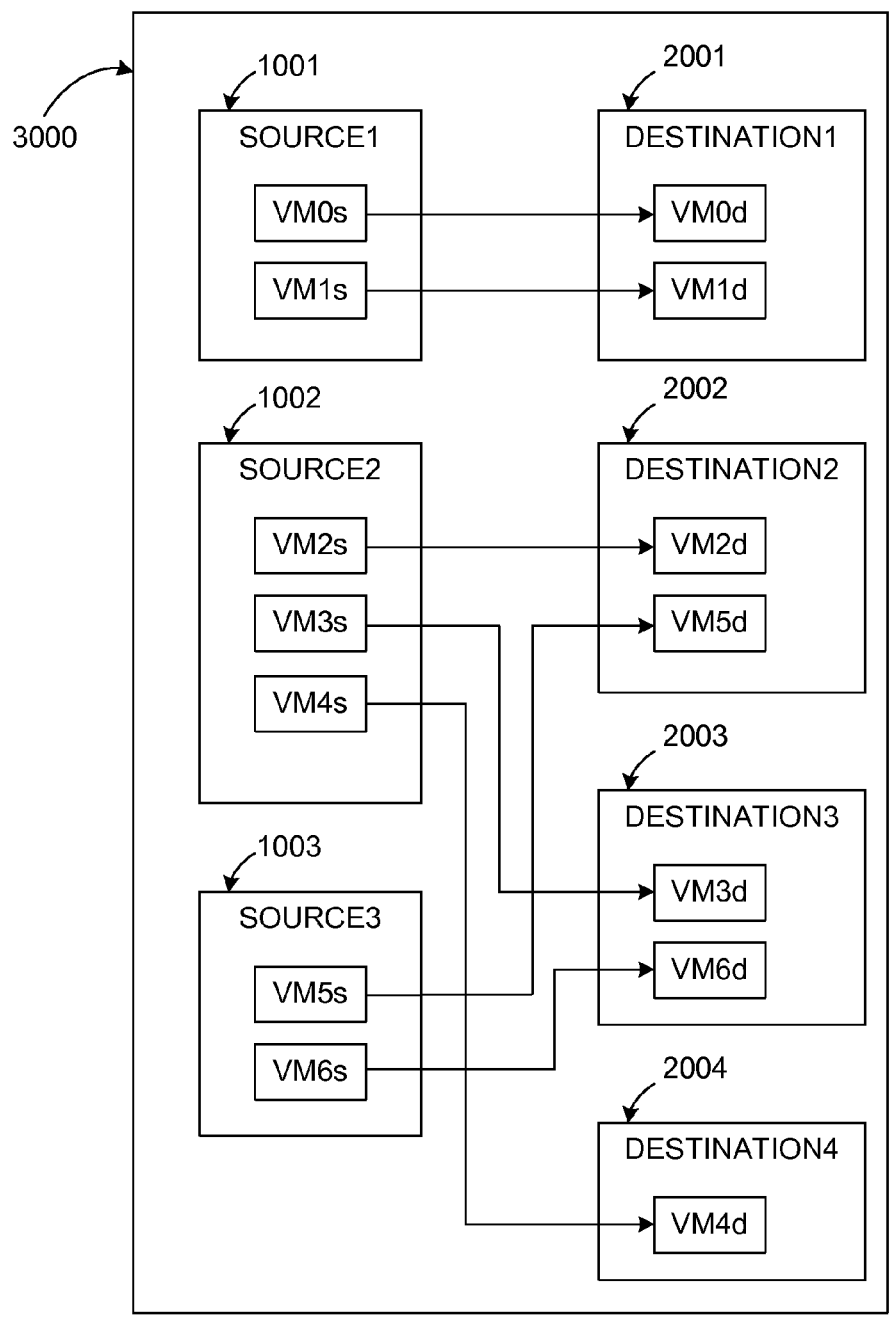
FIG. 4 illustrates that it is not necessary for virtual machines to be migrated according to a one-to-one mapping between source and destination platforms.

As FIG. 4 illustrates, it is also not necessary for there to be a single source platform, a single destination platform, or a one-to-one mapping between sources and destinations. Rather, as FIG. 4 shows, there may even be a different number of sources (shown as 1001, 1002, 1003) than there are destinations (2001-2004); moreover, different VMs of a given source may be migrated to different destinations (for example, the VMs in Source2 are migrated to three different destinations), and a given destination may host VMs migrated from different sources (such as Destination3 receiving VMs from both Source2 and Source3). The VC 5000 may thus choose which VM(s) of which source(s) to migrate to which destination(s) according to any implemented metric, protocol, user selection, etc.

For a set of VMs, there are therefore two sets of memberships: a source-side membership and a destination-side membership. Whether a particular VM is to be migrated or not, and therefore a source-side member, may be determined in different ways. One way would be for a given load-balancing routine, in conjunction with the migration module(s) 660 and/or 860 in the virtualization system to select which VM(s) must be migrated. This would not need to be at the level of individual VMs—if a single application is running on more than one VM and for whatever reason the platform system wants to migrate execution of the application, then it may naturally choose all of the associated VMs as source-side members. Still another method would be for VMs to be selected for migration by an operator, for example, via the console OS 420, according to any given policy, which might be based on purely technical considerations such as load balancing, or on other factors such as wanting to migrate the VMs of a particular customer to a higher-speed platform. Regardless of what policy is applied, or by which component or operator, the migration module 660 or 860 passes the list of source members to whatever platform system software that coordinates migration; note that this can be the migration module(s) 660/860 themselves.

For example, consider FIG. 3, which shows a set of VMs VMxy, where x=0, 1, . . . , N and y=s for "source" and d for "destination" memberships.

Virtual machines are able to issue messages to their respective VMMs, which can then communicate these, possibly via the kernel 600, to other virtual computers; in some other configurations, such as "para-virtualized" systems that permit VMs to communicate, at least with respect to some operations, directly with components outside their own virtualized environment. In this description, unless otherwise made clear, when it's said that a "VM" communicates or receives information, it is to be understood that this is accomplished either by a higher level component such as the corresponding VMM, kernel, or other system-level or supervisory level software in implementations that do not allow direct communication by the VM to other VMs or migration-controlling components. In para-virtualized systems that so allow at least limited direct communication by a VM to non-hypervisor components, message communication may occur more directly using software modules that function as those described here in the VMM or kernel; skilled system designers will know how to implement any changes needed in para-virtualized systems.

Communication between different VM platforms, such as between the source 1000 and destination 2000, may take place over any existing channel, for example, a known public or proprietary local or wide-area network 700 such as the Internet, an internal enterprise network, etc., or a dedicated platform-to-platform network technology such as Fibre Channel.

Migration of a group VMs involves at least two main steps: First, the state of each source VM is reconstructed and copied on a destination VM. The question then becomes: When is it time to switch over execution from the source to the destination? Some aspects of reconstruction of a source VM on a destination are described above, such as stunning and pre-copying. Other aspects specific to the case in which multiple VMs are migrated as a group are discussed below, as are different embodiments directed to different switch-over scenarios.

As part of migrating a plurality (group) of VMs, the various embodiments employ group-level stunning of the VMs in the group before switch-over from the source to the destination platform, if this is possible. Once group membership is computed/established, keepalive messages to the various VMs may be used to maintain the group.

Group-Level Stun

A goal of group migration is to provide group-level switch-over of execution from source to destination for all VMs in a defined set, and doing so without unacceptable VM downtime even though all the VMs in the group may be stunned during the migration process. For example, there may be a design specification that the downtime that a user experiences will not exceed some threshold, such as 1.0 second.

VM Stun

During migration, a VM may need to be stunned when memory pre-copy is completed to allow for computation of a checkpoint and transfer to the corresponding destination. The time at which a VM gets stunned therefore depends on memory pre-copy convergence. To achieve a group-level stun, all VMs should preferably converge at roughly the same time, that is, within some acceptable stun time window, which will be closely aligned with a memory pre-copy convergence time window, described below. Approximately simultaneous convergence avoids "fast", that is, relatively quickly converging, VMs in the group having to be idle waiting for relatively slowly converging VMs to converge. A VM's memory pre-copy convergence depends on the VM's memory size, memory dirty rate and transmit rate: the bigger the memory and the more it is being changed during the pre-copy procedure, the longer it will take to transfer the memory contents coherently to the destination; the higher the transfer rate, however, the faster memory contents can be transferred. One example of a formula that may be used to compute the Memory Pre-copy Convergence Time (MPCT) of a VM is:

$$MPCT=[\text{Memory size}/(\text{transmit rate}-\text{dirty rate})]$$

Different MPCT formulas may also be used depending on any other known factors that affect the migration rate of VMs in a given configuration. In a group, different VMs will have different memory sizes, dirty rates and transmit rates. Uniform memory pre-copy convergence is therefore not generally possible by starting migration of all VMs in the group at the same time unless some measures are taken to adjust the relative speeds at which different VMs are migrated. Assume, for example, that a particular virtual application comprises one VM that virtualizes a database server with a 1 TB memory and another VM that virtualizes a web server with 100 GB memory. Assume further that the virtualized database server has a high dirty rate and the virtualized web server has a high transmit rate. It would be highly unlikely to achieve group-level stun for both VMs even if pre-copy starts at the same time.

According to one aspect, in order to achieve group-level stun, the VMs exchange their respective expected memory pre-copy convergence times, that is, MPCTs, and adjust their memory dirty rates and network transmit rates in such a way that memory pre-copy convergence is achieved within a memory pre-copy convergence window—for example, on the order of 100 ms—for all group members. This will prepare the VMs for a group-level stun.

Note that the MPCT value for any given VM may change during the migration process. In other words, MPCT is typically a dynamic value. Although it would be possible for VMs to compute their MPCTs once, during preparation for stun and migration, that is, the system could treat MPCT as a static value, in this example, when memory pre-copy starts, the VMs dynamically exchange MPCT information at some pre-determined, preferably regular intervals, for example, every 5 secs. The MPCT exchange rate may itself be treated as a dynamic value, such that if the system notices a rapid change in relative MPCT values, it could increase the exchange rate, but reduce the rate if convergence is progressing as expected. The migration module 660 in the kernel then computes and transmits each source VM's ( ) MPCT to all members in the source group. In practice, this information may be received and compared by the migration module 660. When a source VM receives the MPCTs from all members, the migration module 660 compares its MPCT with the MPCTs of all the other VMs in the source group. The migration module 660 then identifies the slowest VM in the source group and reduces the transmission rate of the faster VM to where its MPCT is equal to the slowest source VM's MPCT. In the process of doing so, if it finds that memory pre-copy convergence is still not possible, the module 660 directs the VMM of the "too fast" VM to readjust that VM's dirty rate.

The kernel may apply different metrics to determine if memory pre-copy convergence (MC) is within acceptable limits. For example, MC may be measured as the ratio:

$$MC=[\text{transmit rate}/\text{dirty rate}]$$

The kernel may determine that memory pre-copy convergence is achieved if MC is greater than a threshold, such as 1.3, which also sets a maximum threshold time period within which memory pre-copy convergence for all VMs in the group should complete.

If adjusting the transmit rate results in not achieving memory pre-copy convergence, the kernel may start SDPS—stun during page send—for the "too fast" VM. This informs the VMM that MC is not possible and the memory dirty rate of the VM needs to be slower. The VMM may then in turn inject stun times (a known operation) for the vCPUs 210 so that the memory dirty rate is reduced.

By adjusting the transmit rate and dirty rate at regular intervals, all VMs in the source group can converge at the rate of the slowest VM in the group. Note that the slowest VM does not have to adjust any of its rates as long as it sends out its MPCT, which helps to achieve group-level stun.

VMs that have huge differences in memory sizes (for example, 1 TB vs 10 GB) will typically also have greatly different MPCTs. In such cases, the smaller VM starts pre-copy, installs memory traces and waits for MPCT from other VMs before starting to actually copy memory pages. If it finds a big difference in MPCT, it will wait in the trace phase where memory traces are installed to track changes to pages and will not proceed with pre-copying memory. Once it starts to pre-copy memory, it needs to adjust its transmit rate, which in turn may result in adjusting dirty rate and starting SDPS. SDPS has performance implications on VM, so the VM should avoid starting pre-copy if there is big difference in MPCT. Only when MPCT is in range of the slowest MPCT in the group should the VM proceed from the memory trace phase to the memory pre-copy phase. Any metric may be used to determine within what range MPCT difference are acceptable. Pre-copy convergence can then be assured to within some chosen time window, such as 100 ms, while still reducing the negative impact of the process on VM performance.

It would be possible to use SDPS as the primary method for ensuring memory pre-copy convergence of at least some VMs to within the chosen converge period. For example, SDPS may be used to reduce the page dirty rate of a VM, which improves the transmit-to-dirty ratio, which in turn speeds memory pre-copy convergence: A VM that is stunned or that has stun times inserted will not be changing its memory pages, or at least not as often, which means in general that memory pre-copy convergence may occur faster.

In short, consider a march in which all members of a group should reach a destination within a certain time of each other. One way to accomplish this would be to stagger the start by holding faster members back and releasing them according to when they would be expected to finish. Another way is to allow all the members to start marching at the same time, but to deliberately slow down the faster members so that all progress toward the goal at roughly the same speed; if even this doesn't slow down the fastest marchers enough, one can occasionally order them to halt and pause (stun injection) so that they do not get too far ahead.

Disk Migration

To fully migrate a group of virtual machines, their respective disk contents should also be transferred in some way from their source(s) to chosen destination(s). The method chosen to do so will depend on factors such as the relative size of the disks, relative current workloads, network bandwidths, etc. One method, known as "vMotion" in VMware-type systems, requires no actual disk content migration at all; rather, in such a shared storage/new host implementation, the source and destination access the same storage, such that there is no need for actual migration of storage content—the virtual disk(s) are simply closed at the source and opened at the destination when the source is quiesced. Other methods may be used, however. For example, in one environment, two different methods were employed to enable source-to-destination switch-over of storage: "Storage vMotion", in which the source and destination run on a shared host, but the destination VM is assigned new storage; and "Unified vMotion", in which the destination VM is assigned not only new storage but also a new host, that is, nothing is shared.

Group migration as described here is applicable to all three methods for enabling source storage contents to be made available to a destination; this invention doesn't necessarily require disk sharing between the source and destination, although this is possible. If it is shared, it will be vMotion and disks are not migrated. If it is not shared, as in case of storage/unified vMotion, then disks will be migrated, which will take longer. For storage vMotion, disk pre-copy (similar to memory pre-copy) may be employed, followed by stun. In case of Unified vMotion, the sequence is disk pre-copy followed by memory pre-copy, stun and then execution switch-over. The migrating VMs therefore need to co-ordinate among themselves so that they finish disk pre-copy at the same time, similar to memory pre-copy. Disk pre-copy may be accomplished using a single pass over the VM's disk, that is, not necessarily iteratively. Given disk size, number of disks and VM IOPS (I/O operations per sec), disk pre-copy can thus be scheduled in such a way such that all VMs finish at approximately at the same time.

Group-Level Switch-Over

Three goals for group-level switch-over of execution of the source VMs to the destination VMs are Consistency, Availability and Partition tolerance (in particular, in the context of group VM migration, referred to here as "group preservation." In the literature, this set of goals is sometimes abbreviated CAP.

Consistency: A VM should not run simultaneously on both the source and destination platforms in the event of failures. In other words, the system should avoid "split brain"—each VM should run either in the source or the destination, but not both.

Availability: Either the source or the destination VM should resume. The VM should not be powered off altogether as a result of migration failure.

Group Preservation (Partition Tolerance): In case of migration failures, the system should prevent split state among VMs. All VMs in the group should coexist either on the source hosts or on the destination hosts. Grouped VMs should not be split between resuming on the source and destination hosts.

Brewer's CAP theorem states, however, that it is not possible to achieve all three guarantees of consistency, availability and partition tolerance in the event of network failures. In the event of network or other failure, guaranteeing two of the goals rules out being able to guarantee the third. Different switch-over protocols are presented here to provide guarantees of different pairings of the goals for group-level VM execution switch-over. One protocol focuses on consistency and group preservation whereas another focuses on consistency and availability.

Impossibility of Group-Level Atomic Switch-Over

The Two Generals problem, sometimes known more generally as the Byzantine Generals problem, and the impossibility proof state that in the presence of an unreliable communication channel it is not possible to achieve group-level consensus. A simplified summary of the "Two Generals" theorem is that if the messengers between two (or more) generals cannot be trusted, then no finite number of messages-confirmation messages-reconfirmation messages— and so on can assure both generals that they will both coordinate correctly and start an attack at the same time. No network is in all cases reliable, and that goes also for whatever network 700, 1700 or otherwise over which the system migrates VMs. Nonetheless, as the term itself implies, group-level VM execution switch-over should happen within as narrow a time window as possible, and preferably so nearly simultaneously that a user doesn't notice a performance degradation. Just as with Two Generals, it is impossible to develop consensus with any number of messages or a protocol that will guarantee an atomic switch-over at the group level. The methods described here, however, are able to limit the failure window to roughly the VM downtime and try to provide consistency while giving up either availability or group preservation.

Resume Handshake Switch-Over

In known virtualization systems, such as the "vMotion" system provided by VMware, Inc., migrating a single VM typically starts with pre-copy of the VM's memory and then stuns the source VM to transfer checkpoint and changed memory pages. Once the checkpoint is restored at the destination VM, it is ready to resume execution. Switch-over happens at this point with the help of a "resume handshake protocol." This switch-over method is extended here so as to achieve group-level switch-over.

Once the destination has all the information to resume execution, it sends a RESUME_HANDSHAKE message to the source and waits to resume execution until it receives an acknowledgement ACK signal from the source. As the name implies, the RESUME_HANDSHAKE message indicates to the source that the destination is now ready to let destination VMs resume execution from the transferred state, but it is waiting for a handshake signal in return, namely, the ACK signal. When the source receives the RESUME_HANDSHAKE message, it replies with the ACK and starts to power off the source VM. If the RESUME_HANDSHAKE signal is lost, a time-out period (for example, of 1 second) is exceeded, the source VM is resumed and the destination VM is instead powered off. If the ACK is lost then neither the source nor the destination resumes, which results in no availability. In all cases, however, consistency is preserved since both the source and destination VMs do not resume at the same time.

Routed Resume Handshake Embodiment

Figure 5:
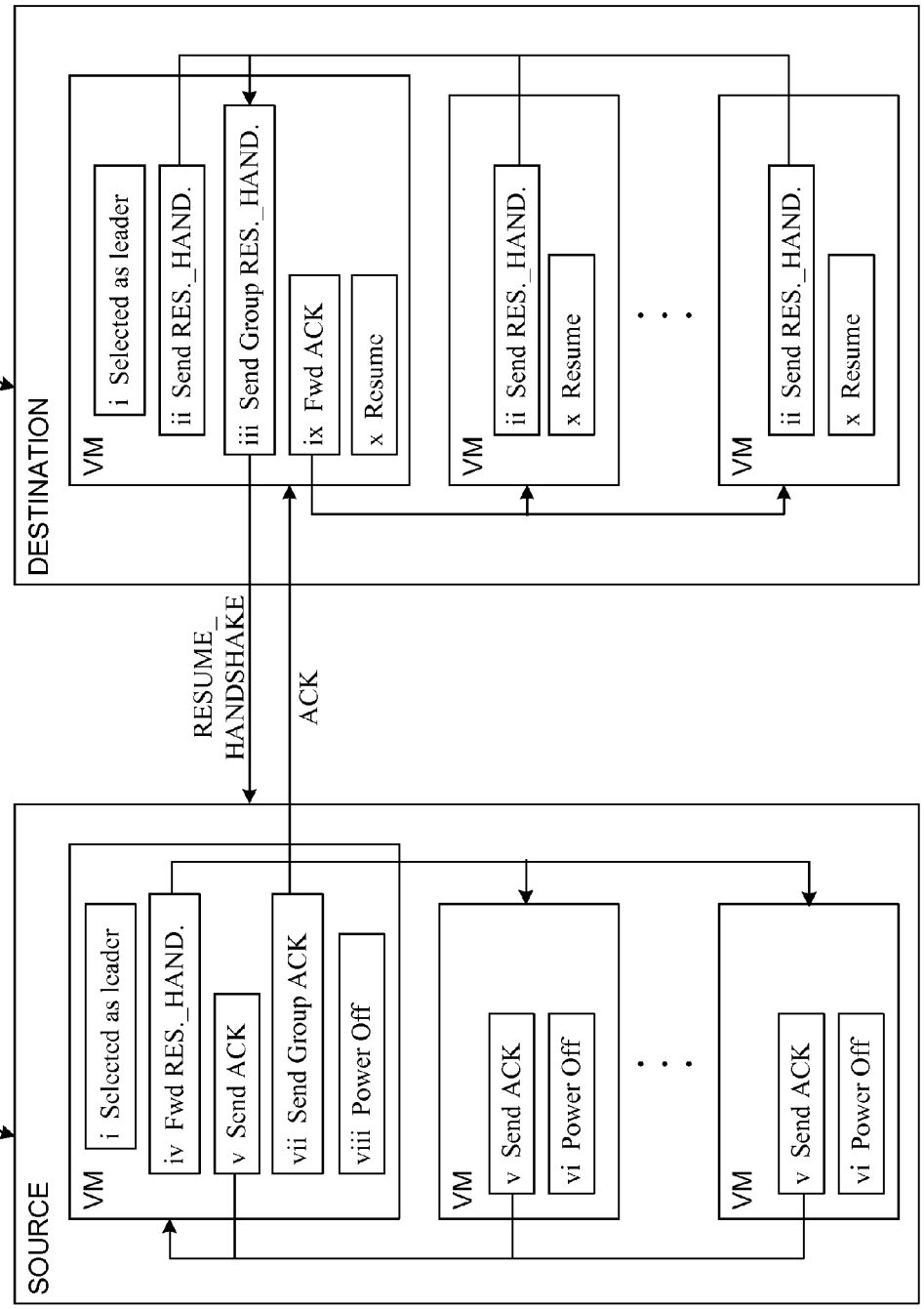
FIG. 5 is a flow/state diagram that illustrates a Routed Resume Handshake embodiment.

One embodiment provides consistency and group preservation for group-level execution switch-over. FIG. 5 illustrates this embodiment. In this embodiment, the platform system, such as the kernel 600 or global virtualization management system 1000, chooses one of the source VMs in the group to be the "leader" (I). One simple choice is to choose the first (in any sense) VM in the group. Another simple choice is to choose as source and destination leaders the VMs between which network latency is minimal, that is, with the lowest round-trip time between the source and destination hosts. If there are typically low latency rates in any case, however, it will generally not matter which VM is chosen as leader.

In this embodiment, the platform systems 1000, 2000 or the virtualization kernels in each of these choose a "leader" VM at both the source 1000 and the destination 2000. For example, simply since they are numerically the first, VMOs and VMOd may be the respective leader VMs. Resume handshake protocol messages route through the leader VMs, with source VMs routing their messages through the source leader VM and destination VMs routing their messages through the destination leader VM. The destination leader VM waits until it (II) receives the resume handshake from all its group members, and from itself. After that, it (III) sends a (one typically suffices) RESUME_HANDSHAKE message to its corresponding source leader VM. The source leader in turn (IV) forwards the RESUME_HANDSHAKE to all source VMs (that is, in most implementations, to their respective VMMs). The source VMs (including the source leader itself) then (V) respond with an ACK message to the source leader and then (VI) power off. The source leader waits to receive the ACK message from all its group members and then (VII) sends an ACK message (again, one should suffice) to its corresponding destination leader and then (VIII) powers off. The destination leader in turn (IX) forwards the ACK to all its members. The destination VMs may then (X) resume on receiving the ACK message. Note that it is typically a component at the non-virtualized, system level, such as the migration module 660 in the kernel 600 that actually sends, receives, and maintains a list of the RESUME_HANDSHAKE and ACK messages. Such a list may, however, be maintained by a different component such as the migration module 360 in the VMM.

This embodiment requires only one RESUME_HANDSHAKE message per group by routing all messages to and through the respective leader VM in the group. Source VMs may power off immediately after sending the ACK message, since the destination will already have indicated by sending the RESUME_HANDSHAKE message that it is prepared to resume VM group execution; destination VMs resume only after their leader receives the ACK message, however. Note that this embodiment provides consistency in that VMs do not resume (from being stunned) on both the source and destination sides.

On the other hand, there is a point of failure: The execution failure ("death") of either leader VM will result in failure to complete the group migration since there will be no leader election protocol and thus no VMs through which to route migration messages such as RESUME_HANDSHAKE and ACK. These present two different failure cases, namely, loss or failure of the RESUME_HANDSHAKE message and loss or failure of the ACK acknowledgement.

Lost RESUME_HANDSHAKE: If the RESUME_HANDSHAKE message is lost at the destination it will result in migration failure. If the destination leader VM does not receive the RESUME_HANDSHAKE message from one of its members, it will not forward the message to the source leader VM and the resume VM timeout period will expire on the source VMs, such that they will power on. If the destination leader has sent the resume handshake, however, but it is lost before the source leader receives it, handling may be the same as just described above. If the RESUME_HANDSHAKE message is lost between source group members a lack of availability could arise. The source group members who have successfully received the forwarded RESUME_HANDSHAKE message will reply with an ACK and power off. The members which failed to receive the resume handshake, however, will time out and resume execution. The source leader will not receive ACKs from the source VMs with lost RESUME_HANDSHAKE messages, and as a result, will not send an ACK message back to the destination leader. The entire destination group will timeout and power off as a result. This may lead to some VMs not running on both source and destination.

Lost ACK: When the ACK is lost at the source, it will result in a failure of availability. A source member VM will power off after sending an ACK message, but if this message is lost, the source leader will never be able to send an ACK message to the destination. The VM will therefore not run on either the source or the destination. When the ACK message is lost on the destination side, loss of availability will also result. If the ACK message is lost between the time it is sent from the source leader to the destination leader or when destination leader sends it to its group, the destination VMs will not power on.

The Routed Resume Handshake embodiment therefore displays three out of four failure scenarios that result in no availability, but it avoids consistency issues and preserves the group in the sense there is no split state. The no-availability window is limited to the maximum VM down time, however, within which the switch-over needs to happen. This downtime can be kept as low as 1 second at worst, which will typically not be noticeable to users. This embodiment is useful in cases such as long-distance migrations of application tiers where group preservation is more important than availability.

Ready to Resume Broadcast Embodiment

Figure 6:
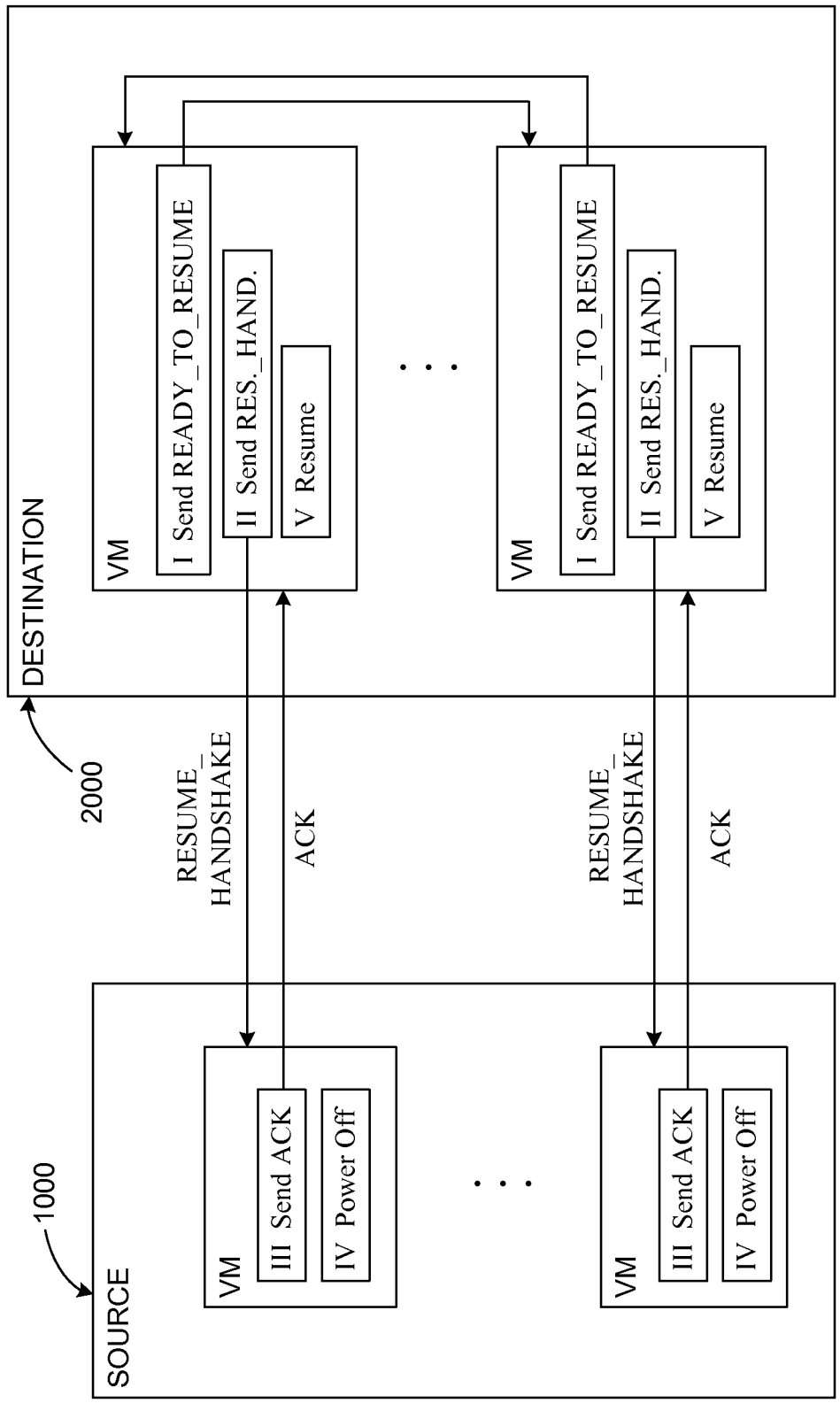
FIG. 6 is a flow/state diagram that illustrates a Ready to Resume Broadcast embodiment.

This embodiment focuses on providing consistency and availability for group-level execution switch-over. See FIG. 6. When a destination VM is ready for switch-over, it (I) broadcasts a READY_TO_RESUME message to all members in the destination VM group. When a destination VM receives the READY_TO_RESUME message from all its group members, which may then (II) send a RESUME_HANDSHAKE message directly to their respective corresponding source VMs. After receiving the RESUME_HANDSHAKE message each source VM may (III) return an ACK message to the corresponding destination VM and then (IV) power off, thereby allowing the destination VMs (V) to resume from their migrated states. As mentioned above, the list of the other VMs in the group and an indication of whether the READY_TO_RESUME message has been received from each may be maintained in either the kernel 600 or in some other component higher in the stack than the VMs themselves.

This embodiment also has a point of failure: If there is a failure to properly communicate either the READY_TO_RESUME or RESUME_HANDSHAKE messages, this embodiment provides consistency and availability in the sense that a given VM will run exactly in one place, that is, either on the source or the destination platform. This is possible because the RESUME_HANDSHAKE is sent directly from each destination VM to its corresponding source VM, as opposed to being routed through a single group leader as a "batch" in the form of a single, group-wide RESUME_HANDSHAKE message.

Lost READY_TO_RESUME: If the READY_TO_RESUME message is lost during broadcast, some of the destination member VMs may receive it and some may not. The members who receive the READY_TO_RESUME message will proceed with switch-over and others will timeout and resume at the source. Failure of the READY_TO_RESUME message therefore may result in a split state, but this embodiment still provides availability in the sense that one VM in each source-destination VM pair will be running.

Lost RESUME_HANDSHAKE: If the RESUME_HANDSHAKE message is lost in transmission from the destination to the source, it will result in a timeout and the source VM will resume. This again results in a split state of the group, since some VMs may be migrated whereas others remain executing in the source, but it does provide availability and consistency.

Lost ACK: If the ACK message fails to transmit properly from a source to a corresponding destination VM, there may also be a lack of availability if the source powers off immediately after sending the ACK message.

This Ready to Resume Broadcast embodiment thus provides consistency and availability in two out of three failure scenarios. It limits split state and availability issues to the small window of VM downtime that happens during the stun period for the entire group of VMs. This embodiment is useful, for example, in cases where the group migration happens within a datacenter and availability is more important than group preservation.

Additional Optional Features

In both of the main embodiments presented above, failures may arise because of the inherently unreliable nature of any communication channel, such as the networks 700, 1700. In systems that can access more than one such communication channel, such as an external as well as an internal network (1700 as well as 700), one way to reduce the risk of overall migration failure would be to use the less preferred (for example, because of lower bandwidth, slower transmission rate, or less secure) network channel as a back-up. After timing out waiting for receipt of a message, for example, the supervisory component could either try again, or, if failure is being noticed for too many such messages, the system could switch to trying the alternate network for message transmission. This would of course in general introduce additional delay, but this might be acceptable to achieve other goals such as avoiding split state or total lack of availability. Another option would be to establish a common datastore for a VM group, or even for the source and hardware platforms themselves. Messages could then be communicated using flags or other entries in the common datastore. Again, the additional time delay this would probably cause may be acceptable in some circumstances.

We claim:

1. A method for migrating a group of virtual machines (VMs) from at least one source platform to at least one destination platform, comprising:
    pre-copying contents of memory associated with each source VM to memory associated with a corresponding respective one of the destination VMs such that copying the memories of all source VMs to be migrated is completed within a pre-copy convergence time window;
    stunning each source VM after completion of the pre-copying contents of the memory associated with it;
    checkpointing the stunned source VM and transferring its checkpoint to the destination platform;
    transmitting from the destination platform to the source platform a handshake message indicating readiness to begin execution of at least one of the destination VMs on the destination platform;
    receiving from the source platform an acknowledgement message indicating readiness to transfer execution from at least one source VM to the corresponding destination VM;
    starting execution of each destination VM for which the acknowledgement message has been received; and
    switching execution from the VMs running on the source platform to the corresponding VMs on the destination platform by:
        selecting a source leader VM and a destination leader VM;
        when the destination leader VM has received destination VM resumption messages from all the other destination VMs, transmitting to the source leader VM a destination group resumption message, which the source leader VM forwards to the source VMs;
        when the source leader VM has received source VM acknowledgement messages from all source VMs, which each power off after sending the respective acknowledgement message, sending a source group acknowledgement message to the destination leader VM; and forwarding the source group acknowledgement message to each destination VM, whereupon the destination VMs resume execution.

2. The method of claim 1, comprising stunning the plurality of source VMs such that pre-copying for all the source VMs completes within the pre-copy convergence time window.

3. The method of claim 1, further comprising computing, for each source VM, a pre-copy convergence time.

4. The method of claim 3, comprising computing each pre-copy convergence time as a function of the respective VM's memory size, network transmit rate and dirty rate, where the dirty rate is a function of the rate at which the VM is currently changing the content of physical memory assigned to it.

5. The method of claim 4, further comprising transmitting the current pre-copy convergence time for each VM in the group to the other VMs in the group and adjusting the respective dirty rates and/or network transmit rates of the VMs in the group so that a memory transfer convergence time for all the VMs falls within a threshold period.

6. The method of claim 4, further comprising injecting one or more stun times into at least one of the VMs in the group, whereby a pre-copy convergence time for that VM is shortened to fall within a threshold period.

7. The method of claim 4, further comprising, for at least one of the VMs in the group, installing memory traces, receiving pre-copy convergence times from other VMs in the group, and waiting in a trace phase before proceeding with memory pre-copy until a pre-copy convergence time for that VM falls within a threshold period determined as a function of the pre-copy convergence times.

8. The method of claim 1, further comprising starting execution of each destination VM only when execution of the respective source VM has been halted, whereby no VM is ever executing simultaneously on both the source and destination platforms.

9. The method of claim 1, further comprising pre-copying contents of disk storage associated with each source VM to disk storage associated with a corresponding respective one of the destination VMs.

10. A method for migrating a group of virtual machines (VMs) from at least one source platform to at least one destination platform, comprising:
pre-copying contents of memory associated with each source VM to memory associated with a corresponding respective one of the destination VMs such that copying the memories of all source VMs to be migrated is completed within a pre-copy convergence time window;
stunning each source VM after completion of the pre-copying contents of the memory associated with it;
checkpointing the stunned source VM and transferring its checkpoint to the destination platform;
transmitting from the destination platform to the source platform a handshake message indicating readiness to begin execution of at least one of the destination VMs on the destination platform;
receiving from the source platform an acknowledgement message indicating readiness to transfer execution from at least one source VM to the corresponding destination VM;
starting execution of each destination VM for which the acknowledgement message has been received; and
switching execution from the VMs running on the source platform to the corresponding VMs on the destination platform by:
broadcasting from each destination VM a switch-over ready message to the other destination VMs; and
upon receipt by any destination VM of switch-over ready messages from all the other destination VMs, sending a destination VM resumption message from that destination VM to a corresponding one of the source VMs, whereupon the corresponding source VM returns an acknowledgement message to the respective destination VM and powers off and the destination VM resumes execution.

11. A virtualized computing system comprising:
a processor;
a system memory;
a group of source virtual machines (VMs) on at least one source platform;
a group of destination VMs on at least one destination platform;
a central supervisory system provided for provisioning and managing the overall virtual infrastructure, including defining the groups of source and destination VMs and computing a migration specification for the source and destination VMs; and
at least one system-level migration sub-system including computer-executable code for pre-copying contents of memory associated with each source VM to memory associated with a corresponding respective one of the destination VMs, for stunning each source VM upon completion of the pre-copying of its respective memory contents such that copying the memories of all source VMs to be migrated is completed within a pre-copy convergence time window; for checkpointing and transferring to the destination platform a checkpoint for each stunned source VM; for transmitting from the at least one destination platform to the at least one source platform a handshake message indicating readiness to begin execution of at least one of the destination VMs on the destination platform; for receiving from the source platform an acknowledgement message indicating readiness to transfer execution from at least one source VM to the corresponding destination VM; for starting execution of each destination VM for which the acknowledgement message has been received and for switching execution from the VMs running on the source platform to the corresponding VMs on the destination platform by:
broadcasting from each destination VM a switch-over ready message to the other destination VMs; and
upon receipt by any destination VM of switch-over ready messages from all the other destination VMs, sending a destination VM resumption message from that destination VM to a corresponding one of the source VMs, whereupon the corresponding source VM returns an acknowledgement message to the respective destination VM and powers off and the destination VM resumes execution.

12. The system of claim 11, in which the migration sub-system is further provided for computing, for each source VM, a pre-copy convergence time (pre-copy convergence time).

13. The system of claim 12, further comprising:
physical memory allocated to each source VM corresponding to virtual memory associated with that source VM;
at least one network connecting the source and destination platforms, with a network transmit rate associated with each source VM;
in which:
each source VM has a current dirty rate that is a function of a rate at which the VM is currently changing the content of the physical memory allocated to it; and the migration sub-system is further provided for computing each pre-copy convergence time as a function of the respective VM's physical memory size, network transmit rate and dirty rate.

14. The system of claim 13, in which the migration sub-system is further provided for transmitting the current pre-copy convergence time for each VM in the group to the other VMs in the group and adjusting the respective dirty rates and/or network transmit rates of the VMs in the group so that a memory transfer convergence time for all the VMs falls within a threshold period.

15. The system of claim 13, in which the migration sub-system is further provided for injecting one or more stun times into at least one of the VMs in the group, whereby a pre-copy convergence time for that VM is shortened to fall within a threshold period.

16. The system of claim 13, further comprising a respective system-level, monitoring component controlling each source VM, said monitoring component configured to install memory traces on the physical memory allocated to its source VM, to receive pre-copy convergence times from other VMs in the group, and to cause the respective source VM to wait in a trace phase before proceeding with memory pre-copy until a memory pre-copy convergence time for that VM falls within a threshold period determined as a function of the pre-copy convergence times.

17. The system of claim 11, in which, at all times, each VM executes exclusively on either the source platform or on the destination platform.

18. A virtualized computing system comprising:
a processor;
a system memory;
a group of source virtual machines (VMs) on at least one source platform;
a group of destination VMs on at least one destination platform;
a central supervisory system provided for provisioning and managing the overall virtual infrastructure, including defining the groups of source and destination VMs and computing a migration specification for the source and destination VMs; and
at least one system-level migration sub-system including computer-executable code for pre-copying contents of memory associated with each source VM to memory associated with a corresponding respective one of the destination VMs, for stunning each source VM upon completion of the pre-copying of its respective memory contents such that copying the memories of all source VMs to be migrated is completed within a pre-copy convergence time window; for checkpointing and transferring to the destination platform a checkpoint for each stunned source VM; for transmitting from the at least one destination platform to the at least one source platform a handshake message indicating readiness to begin execution of at least one of the destination VMs on the destination platform; for receiving from the source platform an acknowledgement message indicating readiness to transfer execution from at least one source VM to the corresponding destination VM; for starting execution of each destination VM for which the acknowledgement message has been received and for switching execution from the VMs running on the source platform to the corresponding VMs on the destination platform by:
selecting a source leader VM and a destination leader VM;
when the destination leader VM has received destination VM resumption messages from all the other destination VMs, transmitting to the source leader VM a destination group resumption message, which the source leader VM forwards to the source VMs;
when the source leader VM has received source VM acknowledgement messages from all source VMs, which each power off after sending the respective acknowledgement message, sending a source group acknowledgement message to the destination leader VM; and
forwarding the source group acknowledgement message to each destination VM, whereupon the destination VMs resume execution.

19. A non-transitory computer-readable storage medium having data stored therein representing software executable by a computer, the software including:
instructions for migrating a group of virtual machines (VMs) from at least one source platform to at least one destination platform, comprising:
instructions for pre-copying contents of memory associated with each source VM to memory associated with a corresponding respective one of the destination VMs such that copying the memories of all source VMs to be migrated is completed within a pre-copy convergence time window;
instructions for stunning each source VM after completion of the pre-copying contents of the memory associated with it;
instructions for checkpointing the stunned source VM and transferring its checkpoint to the destination platform;
instructions for transmitting from the destination platform to the source platform a handshake message indicating readiness to begin execution of at least one of the destination VMs on the destination platform;
instructions for receiving from the source platform an acknowledgement message indicating readiness to transfer execution from at least one source VM to the corresponding destination VM;
instructions for starting execution of each destination VM for which the acknowledgement message has been received; and
instructions for switching execution from the VMs running on the source platform to the corresponding VMs on the destination platform by:
selecting a source leader VM and a destination leader VM;
when the destination leader VM has received destination VM resumption messages from all the other destination VMs, transmitting to the source leader VM a destination group resumption message, which the source leader VM forwards to the source VMs;
when the source leader VM has received source VM acknowledgement messages from all source VMs, which each power off after sending the respective acknowledgement message, sending a source group acknowledgement message to the destination leader VM; and
forwarding the source group acknowledgement message to each destination VM, whereupon the destination VMs resume execution.

20. The non-transitory computer-readable storage medium of claim 19, further comprising instructions for stunning the plurality of source VMs such that pre-copying for all the source VMs completes within the pre-copy convergence time window.

21. The non-transitory computer-readable storage medium of claim 19, further comprising instructions for computing, for each source VM, a pre-copy convergence time.

22. The non-transitory computer-readable storage medium of claim 21, further comprising instructions for computing each pre-copy convergence time as a function of the respective VM's memory size, network transmit rate and dirty rate, where the dirty rate is a function of the rate at which the VM is currently changing the content of physical memory assigned to it.

23. The non-transitory computer-readable storage medium of claim 22, further comprising instructions for transmitting the current pre-copy convergence time for each VM in the group to the other VMs in the group and adjusting the respective dirty rates and/or network transmit rates of the VMs in the group so that a memory transfer convergence time for all the VMs falls within a threshold period.

24. The non-transitory computer-readable storage medium of claim 22, further comprising instructions for injecting one or more stun times into at least one of the VMs in the group, whereby a pre-copy convergence time for that VM is shortened to fall within a threshold period.

25. The non-transitory computer-readable storage medium of claim 22, further comprising, for at least one of the VMs in the group, instructions for installing memory traces, receiving pre-copy convergence times from other VMs in the group, and waiting in a trace phase before proceeding with memory pre-copy until a pre-copy convergence time for that VM falls within a threshold period determined as a function of the pre-copy convergence times.

26. The non-transitory computer-readable storage medium of claim 19, further comprising instructions for starting execution of each destination VM only when execution of the respective source VM has been halted, whereby no VM is ever executing simultaneously on both the source and destination platforms.

27. The non-transitory computer-readable storage medium of claim 19, further comprising instructions for pre-copying contents of disk storage associated with each source VM to disk storage associated with a corresponding respective one of the destination VMs.

28. A non-transitory computer-readable storage medium having data stored therein representing software executable by a computer, the software including:
   instructions for migrating a group of virtual machines (VMs) from at least one source platform to at least one destination platform, comprising:
   instructions for pre-copying contents of memory associated with each source VM to memory associated with a corresponding respective one of the destination VMs such that copying the memories of all source VMs to be migrated is completed within a pre-copy convergence time window;
   instructions for stunning each source VM after completion of the pre-copying contents of the memory associated with it;
   instructions for checkpointing the stunned source VM and transferring its checkpoint to the destination platform;
   instructions for transmitting from the destination platform to the source platform a handshake message indicating readiness to begin execution of at least one of the destination VMs on the destination platform;
   instructions for receiving from the source platform an acknowledgement message indicating readiness to transfer execution from at least one source VM to the corresponding destination VM; and
   instructions for switching execution from the VMs running on the source platform to the corresponding VMs on the destination platform by:
      broadcasting from each destination VM a switch-over ready message to the other destination VMs; and
      upon receipt by any destination VM of switch-over ready messages from all the other destination VMs, sending a destination VM resumption message from that destination VM to a corresponding one of the source VMs, whereupon the corresponding source VM returns an acknowledgement message to the respective destination VM and powers off and the destination VM resumes execution.

* * * * *